United States Patent [19]

Chuang

[11] Patent Number: 4,925,329

[45] Date of Patent: May 15, 1990

[54] JOINT FOR FOLDABLE LADDERS

[76] Inventor: Yuan-Chan Chuang, No. 106-1, Chang-Shan Rd., Wu-Jih Hsiang, Tai-Chung Hsien, Taiwan

[21] Appl. No.: 276,035

[22] Filed: Nov. 25, 1988

[51] Int. Cl.⁵ ............................................. F16C 11/00
[52] U.S. Cl. ..................................... 403/93; 182/163; 16/332
[58] Field of Search ...................... 403/93, 95; 182/21, 182/22, 24, 163; 16/332, 334, 349, 324

[56] References Cited

U.S. PATENT DOCUMENTS

| 4,543,006 | 9/1985 | Wang | 403/93 |
| 4,645,371 | 2/1987 | Wang | 403/93 |
| 4,805,737 | 2/1989 | Peng | 403/93 X |

Primary Examiner—Andrew V. Kundrat
Attorney, Agent, or Firm—Browdy and Neimark

[57] ABSTRACT

A joint for foldable ladder including a hollow disk body having a hollow leg which connects the hollow disk body to the ladder and a number of circumferential cutouts for setting a pre-determined angle of the ladder; a casing having a circular part which rotatably encases the hollow disk body and a hollow leg which connects the ladder, the circular part including two spaced apart circular plates which encase and rotatably engage with the hollow disk body, and the hollow leg including a slot at each surface; a trigger pivotally provided on a lateral side of the casing; an arcuate seat provided within the casing; and a lock piece movable along the casing with respect to the slot of the casing and which is fixed on the arcuate seat at one end and is fixed on the casing at the other end.

7 Claims, 7 Drawing Sheets

JOINT FOR FOLDABLE LADDERS

BACKGROUND OF THE INVENTION

The present invention relates generally to ladders, and more particularly, to a joint for ladder.

Heretofore, ladders have been available in many constructions that are foldable for storage and indeed openable for use. However, conventional ladders can be propped open at a certain angle only, in other words, the ladder is adapted for only one fixed working condition only.

Accordingly, ladders which can be propped open at different angles have been produced. However, these ladders have been very complicated in structure.

SUMMARY OF THE INVENTION

It is therefore a primary object of the present invention to provide a foldable ladder which can be propped open and fixed at different angles.

Another object of the present invention is to provide a joint for foldable ladder which is constructed in a relatively simple manner.

These and other objects and advantages of the present invention will become apparent to those skilled in the art upon reading the detailed description provided hereinbelow, with appropriate reference to the accompanying drawings.

DETAILED DESCRIPTION OF THE PREFERRED EMBODIMENT

Figure 1:
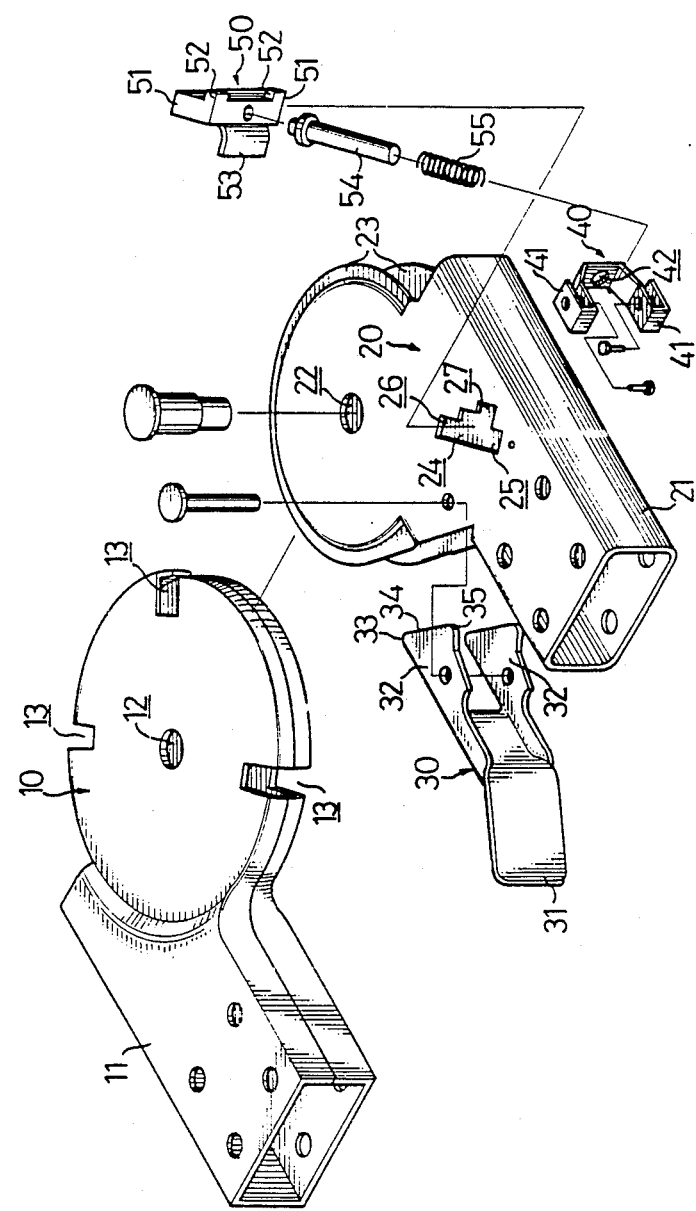
FIG. 1 is an exploded view of a joint for foldable ladder in accordance with the present invention.

Referring to the drawings and initially to FIG. 1, it can be seen that a joint for a foldable ladder in accordance with the present invention comprises a hollow disk body 10 having an integrally formed first hollow leg 11 which connects the hollow disk body 10 to the ladder (not shown), a casing 20 having a circular part which rotatably encases the hollow disk body 10 and a second hollow leg 21 which connects the ladder, a trigger 30 pivotally provided on a lateral side of the casing 20, an arcuate seat 40 provided within the casing 20, and a lock piece 50 which is fixed on the arcuate seat 40 at one end and is fixed on the casing 20 at the other end.

It is appreciated that the hollow disk body 10 is encased by the casing 20 and is rotatable therewith. In one embodiment, the hollow disk body 10 has a central hole 12 and the circular part of the casing 20 also has a central hole 22 such that the circular part of the casing 20 can encase and rotatably engage with the hollow disk body 10 by passing a rivet through the two aligned central holes 12 and 22 after assembly.

The hollow disk body 10 includes a plurality of circumferential cutouts 13, for example, three, as shown in the preferred embodiment, for the purpose of setting the predetermined angle of the ladder.

It is also appreciated that the circular part of the casing 20 is composed of two parallelly spaced apart circular plates 23 extended from the hollow leg 21. The space between the two circular plates 23 is of a dimension sufficient to receive the hollow disk body 10. The surface of the casing 20 is provided with a slot 24 for receiving the arcuate seat 40 and the lock piece 50. Although only the upper face of the casing 20 is shown in the embodiment, it should be noted that the lower face of the casing 20 is identical unless otherwise indicated. The shape of the slot 24 is such that the arcuate seat 40 and the lock piece 50 can install therein and the lock piece 50 can slide therealong. Particularly, the slot 24 has a first end 25 for fixing the arcuate seat 40, a second end 26 remote from the first end 25, and a third end 27 intermediate the first end 25 and the second end 26 for locating the lock piece 50 and for the same to slide along.

The trigger 30 is inserted into the casing 20 at a lateral location between the hollow disk body 10 and the casing 20 for controllably urging the lock piece 50. As is common in structure, the trigger 30 includes a grip part 31 and two wings 32. The wings 32, each having an aperture thereon, are adapted to be pivotally engaged with the casing 20 by means of rivets. Each wing 32 includes a top edge 33, a slant face 34 and a lower edge 35 for cooperation with the lock piece 50 which will be described more fully hereinbelow.

The arcuate seat 40 includes two lugs 41 so as to be mounted on the respective first end 25 of the slot 24 by means of two rivets. The arcuate seat 40 further includes a hole 42 for receiving the lock piece 50.

The lock piece 50 is substantially a symmetrical body having two outer edges 51, two protuberances 52, a shoulder 53 extended laterally from the body of the lock piece 50, a spring-loaded supporting rod 54, and a spring 55 which encompasses the rod 54. The shoulder 53 is subjected to cooperate with the lower edge 35 of the trigger 30. The spring-loaded supporting rod 54 is fixed on the arcuate seat 40 through the hole 42 and can pass through the hole 42. The lock piece 50 is movable along the second hollow leg 21 with respect to the position of the slot 24 formed on the surface of the casing 20.

With particular reference to FIGS. 2 to 6, the manner in which the joint is fastened and adjusted are depicted.

Figure 2:
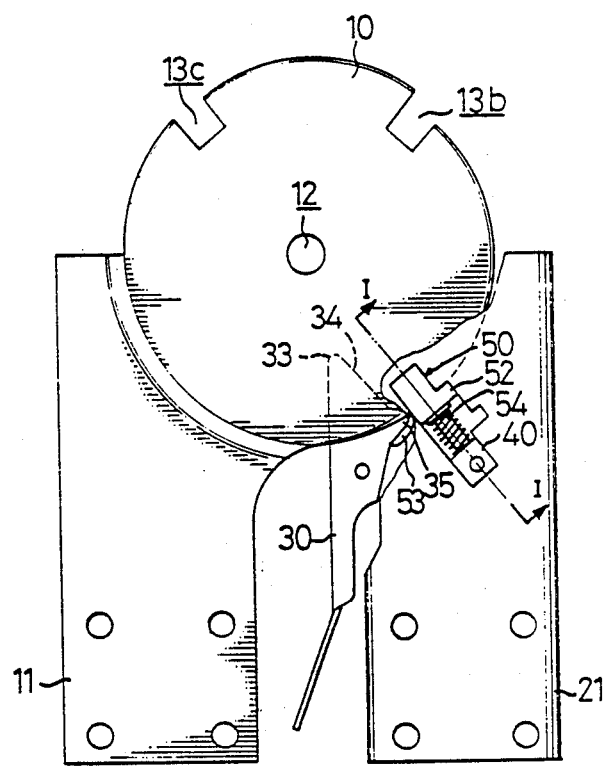
FIG. 2 is an elevational view illustrating the joint in a folded state.

In FIG. 2, the joint is shown in a folded state, in which lock piece 50 is clamped in the cutout 13a such that the first hollow leg 11 of the hollow disk body 10 and the second hollow leg 21 of the casing 20 are parallel to each other, i.e., the ladder is folded flat.

To alter the angle between the ladder, the grip part 31 of the trigger 30 is fastened such that the slant faces 34 of the wings 32 are pushed against the shoulder 53 of the lock piece 50 and move the lock piece 50 out of the first cutout 13a such that the second hollow leg 21 can be moved relative to the first hollow leg 11. The trigger 30 can now be pressed further to move the lock piece 50 such that the protrusions 52 lock into the third end 27.

Figure 3:
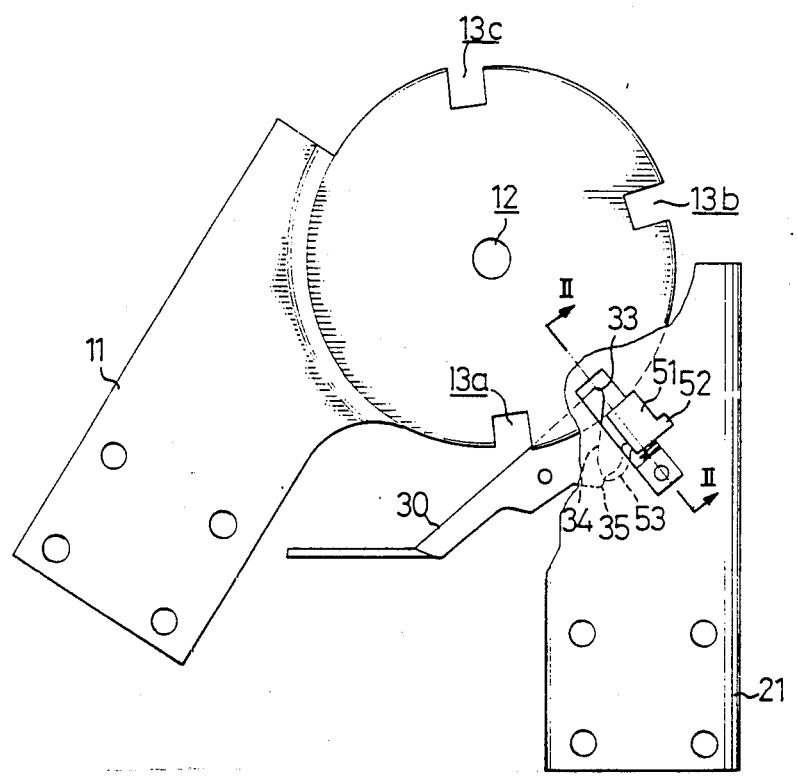
FIG. 3 is an elevational view illustrating the joint in a slightly opened state.

The second hollow leg 21 is now urged so that the lock piece 50 will engage with the second cutout 13b as shown in FIG. 3.

Figure 4:
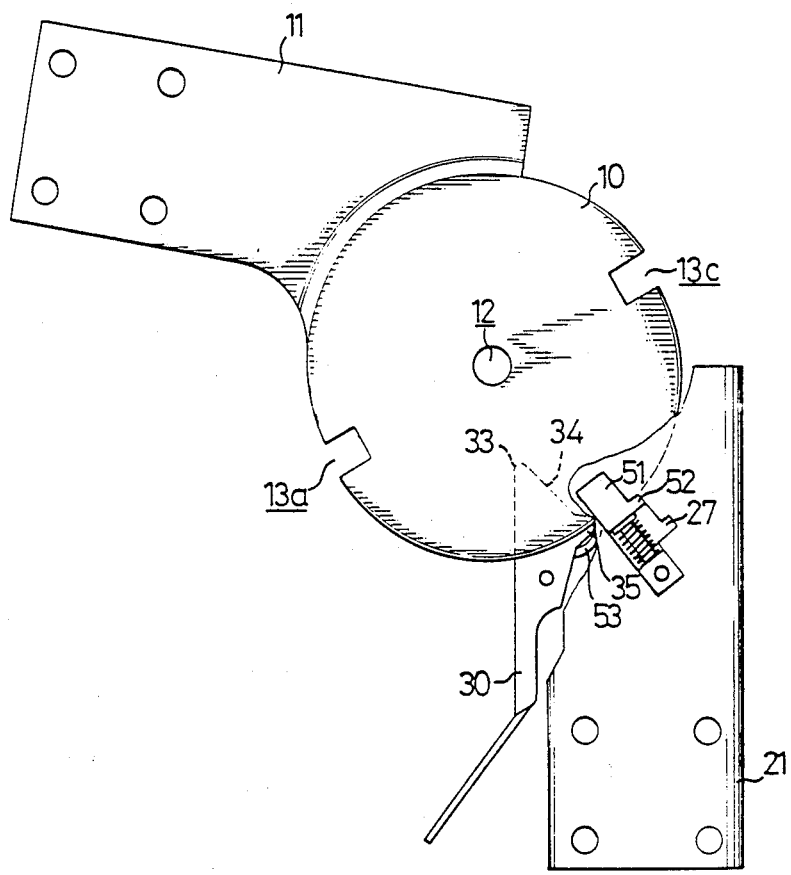
FIG. 4 is an elevational view illustrating the joint in a substantial opened state.
Figure 5:
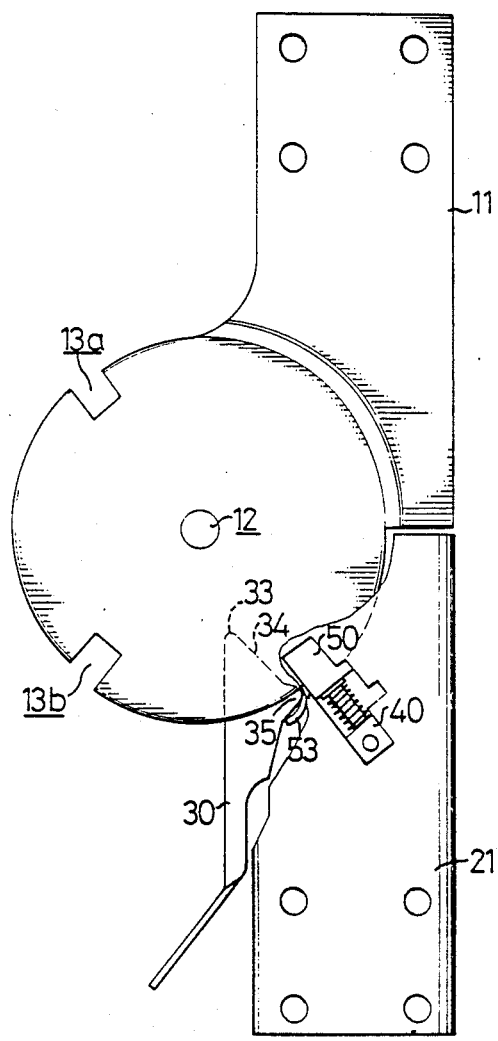
FIG. 5 is a an elevational view illustrating the joint in a totally opened (180 degrees) state.

In FIG. 4, the lock piece 50 in cutout 13b is urged in substantially the same manner to the next cutout 13c so as to form a 180 degree linear joint, as in FIG. 5.

Figure 6:
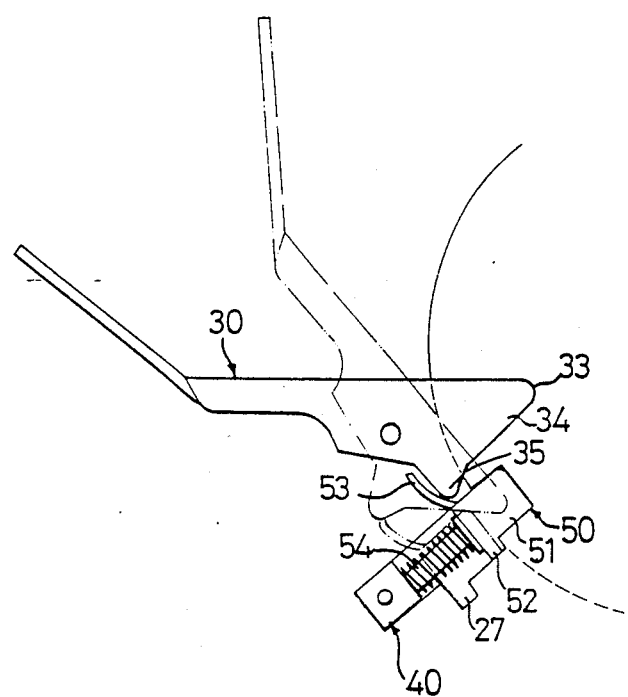
FIG. 6 is an enlarged fragmentary view illustrating the movement thereof.

Referring next to FIG. 6, when it is desired to alter the angle of the ladder, one should first press the trigger 30 with the rivet acting as an axis so that the lower edges 35 presses the shoulder 53 of the lock piece 50 and at the same time, the slant faces 34 of the trigger 30 presses the lock piece 50 such that the lock piece 50 disengages from the instant cutout 13 and the outer edge 51 of the lock piece 50 abuts against the outer circumference of the hollow disk body 10 and the protuberance 52 of the lock piece 50 slides from the second end 26 to the third end 27. Accordingly, one may press the trigger 30 so that the lower edges 35 thereof spring back to the shoulder 53. When the lock piece 50 aligns with the next cutout, the protrusions 52 leave the third end 27 due to the bending moment on the spring 55 and the supporting rod 54, and the spring 55 urges the lock piece 50 into the next cutout 13. Thus, one would have no fear at all that his finger(s) would be clamped by the trigger 30.

Figure 7:
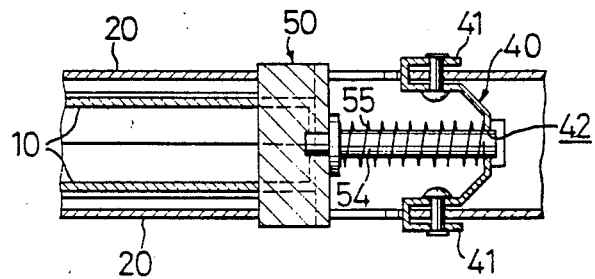
FIG. 7 is an enlarged sectional view taken along line I—I of FIG. 2, illustrating the structure thereof before the lock piece is inserted into the slot.
Figure 8:
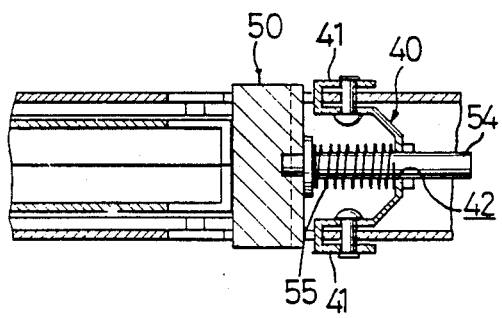
FIG. 8 is an enlarged sectional view taken along line II—II of FIG. 3, illustrating the structure thereof after the lock piece is inserted into the slot.

Referring to FIGS. 7 and 8, it can be seen that the arcuate seat 40 is attached to the hollow leg 21 of the casing 20 and the lock piece 50 is combined with the arcuate seat 10 through the spring-loaded supporting rod 54. When the lock piece 50 is clamped in the cutout 13, the situation is as shown in FIG. 7. When the lock piece 50 is not clamped in the cutout 13, the situation is as shown in FIG. 8.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A joint for foldable ladder comprising:

a hollow disk body having a first hollow leg which connects said hollow disk body to said ladder and a plurality of circumferential cutouts for setting a predetermined angle of said ladder;

a casing having a circular part which rotatably encases said hollow disk body and a second hollow leg which connects said ladder, said circular part including two spaced apart circular plates which encase and rotatably engage with said hollow disk body, and said second hollow leg including a slot at each surface, each off said slots having a first end, a second end remote from said first end, and a third end intermediate said first and second ends;

a trigger pivotally provided on a lateral side of said casing;

an arcuate seat provided within said casing fixed at said first end of said slot; and a lock piece movable along said casing with respect to said slot of said casing and which is fixed on said arcuate seat at one end and is fixed on said casing at the other end, said lock piece being substantially a symmetrical body having two outer edges, two protuberances, a shoulder extended laterally from the body of the lock piece, a spring-loaded supporting rod, and a spring which encompasses said supporting rod, said lock piece being fixable in said second end and third end of said slot.

2. A joint as claimed in claim 1, wherein said hollow leg is integrally formed with said hollow disk body.

3. A joint as claimed in claim 1, wherein said hollow disk body has a central hole and said circular part of said casing also has a central hole such that said circular part of said casing encases and rotatably engages with said hollow disk body by passing a rivet through the two aligned central holes after assembly.

4. A joint as claimed in claim 1, wherein said hollow disk body includes three circumferential cutouts.

5. A joint as claimed in claim 1, wherein said trigger includes a grip part and two wings.

6. A joint as claimed in claim 5, wherein each wing includes a top edge, a slant face and a lower edge for cooperation with said lock piece.

7. A joint as claimed in claim 1, wherein said arcuate seat includes two lugs so as to be mounted on the respective first end of said slot, and a hole for receiving said lock piece.

* * * * *